United States Patent
Tiffany

[11] Patent Number: 5,829,446
[45] Date of Patent: Nov. 3, 1998

[54] COMPETING OPPOSING STIMULUS SIMULATOR SICKNESS REDUCTION TECHNIQUE

[75] Inventor: John R. Tiffany, Grand Prairie, Tex.

[73] Assignee: Raytheon Company, Lexington, Mass.

[21] Appl. No.: 758,323

[22] Filed: Dec. 3, 1996

[51] Int. Cl.$^6$ ........................................ A61B 19/00
[52] U.S. Cl. ...................... 128/898; 600/558; 434/44; 348/121
[58] Field of Search .............................. 600/26, 27, 558; 606/10; 607/88; 128/897–898; 352/57, 86; 434/44; 345/114, 115, 121, 127, 129, 130; 359/446; 395/406, 920, 924, 952; 446/7, 144, 145, 230–232, 472–474, 483; 348/121–124

[56] References Cited

U.S. PATENT DOCUMENTS 5,067,941  11/1991  Hendricks .................................. 600/27
5,499,920  3/1996  Trumbull .................................. 434/69
5,659,327  8/1997  Furness, III et al. ....................... 345/8

Primary Examiner—Jeffrey R. Jastrzab

[57] ABSTRACT

A simulator which provides competing and opposing stimuli for objects appearing to approach or retreat from the user in order to reduce simulator sickness. A simulator controller (92) monitors the pixels taken up by an object. When an object appears to take up more pixels, the controller interprets the object as appearing to approach the user (96). The controller inserts a complementary object which appears to do the opposite of the primary object detected by the simulator controller (92). Both objects are displayed on a video display (94) viewed by the user (96).

8 Claims, 4 Drawing Sheets

COMPETING OPPOSING STIMULUS SIMULATOR SICKNESS REDUCTION TECHNIQUE

TECHNICAL DESCRIPTION

This invention relates generally to an apparatus and method for use in connection with video simulations and, more particularly, to an apparatus and method for reducing simulation induced sickness in the user resulting from the user having to continually adjust focus from objects appearing to approach or retreat on a screen which remains a substantially fixed distance from the user.

BACKGROUND OF THE INVENTION

Closely following the development of any new motion-associated technology are maladies that some users experience. Various types of motion sickness associated with the transportation modes evolving in any particular era have been reported throughout history. Examples of reported motion sickness include sea sickness, car sickness, air sickness, space sickness, and now, cybersickness on virtual reality (VR) sickness.

Cybersickness has become substantially more prevalent as people use high fidelity simulators to travel through computer generated environments. Simulator sickness, once a temporary condition occurring in healthy individuals during or soon after simulator use, is now being reported in at least two additional varieties: (1) binocular dysphoria, a prolonged defect in depth perception occurring to persons whose frequent use of simulators has allowed them to adapt to the simulation environment, and (2) cybersickness flashback, the sudden onset of simulator sickness symptoms in a simulator user who is no longer in a simulation environment.

Researchers primarily rely on two major theories to explain simulator sickness, the computational lag theory and the sensory conflict theory. The computational lag theory states that mechanisms used to generate displays are not instantaneous. The lag in display generation results in a difference between the actual and the expected visual input as the viewer moves through or manipulates the simulation. The difference between actual and expected input to the nervous system leads to simulator sickness.

The sensory conflict theory, also called the vestibular-ocular incompatibility theory, states that humans maintain neural stores of vestibular reactions to sensory input. When sensory input is received, and vestibular cues corresponding to neural stores do not match, illness results. A broader interpretation of the sensory conflict theory provides that any mismatch between neural stores and sensory input may result in illness.

Numerous universities, consulting firms, technology companies, and entertainment companies have vigorously investigated and attempted to reduce simulator sickness. Methods for reducing simulator sickness have included increasing video update rates, adding motion bases to provide physical sensations to coincide with the video image, adding or improving sound systems, improving video fidelity, introducing distracting objects to scenarios, providing depth through use of lenticular displays, slice stacking, binocular displays, repeated or prolonged exposure to induce physiological or psychological adjustment, and medication. The numerous prior investigations have yet to develop complete solutions for elimination of simulator sickness, but a number of studies have addressed specific ill effects with specific solutions and have identified previously unknown varieties of simulator sickness.

The conventional techniques mentioned above which have been used in an attempt to reduce or eliminate simulator sickness attempt to reduce computational lag, to reduce vestibular-ocular incompatibility, and to adapt the simulator user to the simulation environment. Initial techniques relied on controlling only one condition or parameter to reduce or eliminate simulator sickness. Some initial sophisticated aircraft pilot training simulators and several of the more elaborate simulations appearing recently in theme parks apparently have attempted to control multiple conditions to reduce or eliminate simulator sickness.

Some apparent solutions have been to improve the performance of display generation systems and to add motion bases. Less apparent solutions have included use of distractors, cognitive therapy, drugs, and passive posture restraints. Distractors, such as countdown clocks, narrators, or status displays are fixed on simulation screens in order to periodically draw the viewers attention from the main computer generated display, reducing the severity of illness which would accompany continuous gazing at the display. Distractors, however, reduce the perceived experience of motion or realism that the simulation is designed to provide. Cognitive therapy provides pre-simulation counseling to users, advising them that some simulator sickness is to be expected, but that persons who react to simulators without anxiety experience less illness. Cognitive therapy, however, can reduce the realism of the simulator experience, and it requires individualized application. Drug therapy can be extremely effective in controlling physiological symptoms of simulator sickness. Drug therapy, however, can numb the sensory experience, and the effects of drug treatment may last longer than the exposure to the simulation. Passive posture restraints include headrests and reclining seating which limit movement and cause the participant to view a display from an unusual angle, such as with the eyes rotated downward. The posture restraints do yield some success, but constrain the participant and may distract the participant from the intended realism of a simulation. Finally, adaptation schedules have been used with some success. In an adaptation schedule the user is exposed to a simulation until the user becomes accustomed to the simulation and suffers no ill effects while in the simulation environment. During adaptation, however, the user may become unaccustomed to interactions in his natural environment, may lose the sense of depth perception, and may become unable to quickly re-focus the eyes on objects which change distance from the viewer. Adaptation schedules, drug therapy, and cognitive therapy are not presently used extensively, while distractors, display quality improvements, and motion bases are presently being used more frequently.

More recently, the sensory mismatch theory has been more heavily relied upon to explain simulator sickness than has computational lag. This shift in explanation most likely results from technological advances which have dramatically improved computer scene generation, reducing lag time characteristic of early simulators and increasing the overall fidelity of displays. In fact, many initial simulator sicknesses have been solved by improving both simulator and computer hardware and by improving software. Improved computing capability allows instantaneous generation of highly realistic scenery and objects. Recent data indicates, however, that simulator sickness symptoms still occur when there is no perceptible computational time lag in the visual system of a simulator.

Despite creative solutions and technological advances, incidence and severity of reported simulator sickness are proliferating. While an increase in reported instances of simulator sickness is expected due to proliferation of simulators, the accompanying increase in severity of illness and latent effects are more difficult to explain. Further, several other techniques to reduce simulator sickness have resulted in improved realism of perceived motion, defined as vection. These techniques also tend to reduce some symptoms of motion sickness but do not eliminate other symptoms such as eye strain, loss of balance, and disorientation. In particular, these techniques have yet to eliminate the latent effects that accompany newer simulation environment phenomena, namely optokinetic nystagmus and binocular dysphoria. Like other forms of motion sickness, these simulator artifacts are most likely caused by a mismatch between sensory input and neural stores and appear to be entirely related to interaction of the simulation user with a visual display.

In fixed distance simulations, the distance between the eye and the projected image remains constant while objects appear to be approaching or withdrawing from the viewer. The viewer initially attempts to change the convergence angle of the eyes and to change the shape of the eyes in an attempt to focus on the approaching or withdrawing objects, but the eyes cannot focus because the distance to the visual display remains constant. The eyes execute a repetitive series of rapid, involuntary movements to correct and focus on the focal plane of the projected image or the video display. These repetitive, involuntary movements, called optokinetic nystagmus, are reactions to depth cues presented in the visual display, and precede symptoms of motion sickness, which include eye strain, loss of balance and headaches. Eventually, the user adjusts or accommodates to the display distance remaining fixed and no longer changes the convergence angle or shape of the eyes to focus on objects which appear to approach or withdraw. When leaving the simulation, the inability to change optical convergence continues, resulting in problems with depth perception. The simulator user may also experience postural instability and disturbed motor control until the use readapts to the environment outside the simulator.

The accommodation that the user learns in the simulation is inappropriate outside the simulation, and is sometimes expressed outside the simulation. Inside the simulation, the user learns to focus at a fixed distance, despite apparent approaches or withdrawals of objects. When outside the simulation, the user continues to focus at the same distance, despite the actual distance from objects to the user. Outside the simulation, when the user continues to focus to a fixed distance or has difficulty focusing on objects at varying distances, binocular dysphoria has occurred.

As stated above, simulation sickness occurs when the visual input perceived by the user does not match up with the other sensory input normally perceived by the user. The user enters into the simulation environment with a baseline of learned skills and experiences, often called neural stores or associated stimuli, responses, and outcomes. In everyday experiences, the user is exposed to environmental stimuli and has learned how to respond to those stimuli. The user also learns the consequences or outcomes associated with various responses. The user associates contexts or sets of stimuli with sets of responses and the outcomes which result. These stimuli and responses are stored for future use in the neural stores of the user. When later exposed to the same or similar stimuli in a simulation, the user associates the stimuli to a set of stimuli previously stored in the neural stores. The user responds with the associated set of responses, and expects a set of outcomes. For example, a fighter pilot whose aircraft is launched by a steam powered catapult from the deck of a ship has learned to associate a set of visual, aural, and other sensory stimuli with a set of responses and outcomes which may include manipulating controls, tensing muscles, focusing the eyes, hearing radio communications, and feeling a suddenly increased gravitational force. When the same pilot is exposed to a simulation of the same event, the pilot will match the simulation stimuli with stores of stimuli, respond with a set of responses associated with the set of stimuli, and expect associated outcomes. The closer the match between the simulation stimuli and the actual event stimuli, the greater the number of associated event responses that are exhibited by the pilot and the greater the sense of realism that is reported by the pilot.

This relationship between real world and simulation stimuli can be better explained using set diagrams. With reference to FIG. 1, FIG. 1 shows two overlapping sets 12 and 14 of stimuli 16, 18, and 20. Set 12 is a grouping of stimuli 16 and 18 which occur in an actual event outside the simulation environment, such as the pilot in a fighter aircraft being launched from the deck of an aircraft carrier. Set 14 is a grouping of stimuli 18 and 20 presented in a simulation, such as a pilot training in a flight simulator. The stimuli 16 and 18 of set 12 are associated with a number of responses 22 and 24. Some responses 22 are associated with multiple stimuli, and some responses 24 are associated with other responses 22 and normally occur in sequence. Some of the stimuli 16 in set 12 may always appear in the set 12, but are not specific to the simulation set 14. These stimuli 16 always elicit the same association with responses 22 and 24, whether or not in the context of the simulation set 14. Other stimuli 18 may be context dependent, and their appearance has a different meaning or no meaning without other stimuli 18 contained in the stimuli set 12. The overlapping area of sets 12 and 14 defines stimuli 18 which are identical to both sets of stimuli. The areas which do not overlap contain stimuli 16 and 20 that are not identical to both sets 12 and 14. Simulation developers attempt to design a realistic simulation by maximizing the area of overlapping stimuli 18 and minimizing the number of stimuli 20 in set 14. The stimuli 20 act as potential distractors.

One interpretation to explain motion sickness and a proposed technique for reducing motion sickness is associated with the stimulus sampling theory of William K. Estes, an outgrowth of stimulus-response associationism developed by Edwin R. Guthrie. Estes proposed that organisms, including humans, are continuously sensing stimuli, providing responses, and experiencing outcomes. The organism has several responses which can be provided to any stimulus, but is more likely to repeat a response which has a favorable outcome.

The human operating outside of a simulation, such as a fighter pilot about to take off from an aircraft carrier, senses a number of stimuli associated with other stimuli in a context, and is prepared to provide responses which have been reinforced by favorable outcomes. FIG. 2 shows a set 30 of real world stimuli 32 which a pilot may encounter when operating an aircraft. Four responses A, B, C, and D are associated with stimulus X, and three responses L, M, and N are associated with stimulus Y. Each association between a stimulus X and Y and a response A, B, C, or D and L, M, or N is represented by an arrow 34, 36, 38, 40, 42, 44 and 46, respectively. The associations 36 and 42 with responses B and L are more strongly connected to stimuli X and Y, respectively, than the other association because responses B and L have previously resulted in favorable outcomes. This is demonstrated graphically by using thicker arrows to represent associations 36 and 42. When stimuli X and Y occur in the future in the same context, responses B and L are the most likely responses to occur.

When a simulation attempts to represent an event which occurs outside a simulation, such as, when a flight simulator attempts to replicate taking-off from a ship, the simulation replicates as many event stimuli as possible, elicits responses from the simulator user, and provides some outcome to the simulator user. FIG. 3 is a diagram of the set 30 of stimuli 32 of FIG. 2 which represents the set of stimuli experienced when, for example, an aircraft takes off from a ship. Note that like reference numerals will be used to refer to similar elements throughout the specification. FIG. 3 also depicts a set 50 of stimuli 52 present in a simulator simulating an aircraft taking-off from a ship.

The simulation set 50 has replicated several stimuli 54 of that belonging to set 3Q, including stimuli X and Y. Stimuli 54 are common to both sets 30 and 50. In set 50, the outcome (not shown) of response B in response to stimulus X has been favorable, and the association 36 between the stimulus X and response B is strengthened. This parallels the result for stimulus X of set 30 of FIG. 2. Also in set 50, the outcome (not shown) of response L in response to stimulus Y of set 50 was not the most favorable. Response N in response to stimulus Y of set 50 was the most favorable, and provides a stronger association 46 with stimulus Y than association 42.

On the next occurrence of stimulus Y during the simulation, response N is most likely to be exhibited. If the outcome is not favorable, another response L or M will be selected and more strongly associated with the stimulus. This type of stimulus-response association can be used to explain the occurrence of optokinetic nystagmus and binocular dysphoria. It also forms a basis for devising a countermeasure to these afflictions.

In an actual non-simulation environment, when an object becomes larger, it is most likely approaching the observer. If the object is within about ten meters, the observer must broaden the convergence angle of the eyes to maintain a clear, stereoscopic image. At the same time, the shape of each eye may change slightly to re-focus the image on each retina. The outcome is a clear image and some derived data about the distance from the viewer to the image.

FIG. 4 depicts a set 70 of stimuli 72 which corresponds to the actual, non-simulation environment. One particular stimulus Y of the stimuli 72 represents an object approaching an observer. As stated above, the observer adjusts the eyes in order to maintain focus on the approaching object. Responses L, M, and N represent the change in the angle of convergence of the eyes in response to the approaching object or stimulus Y. Response L corresponds to broadening the convergence angle; response M corresponds to narrowing the convergence angle; and response N corresponds to maintaining the same convergence angle. As stated above, broadening the convergence angle enables the observer to obtain a clear, binocular image. Association 74, which points to response L which corresponds to broadening the convergence angle, is associated with a positive outcome.

In a simulation environment when an object becomes larger, the object most likely occupies more pixels, but the actual distance from the observer to the image remains the same. The observer will initially attempt response L of FIG. 4, but the outcome will be an unclear image. The observer will go through a selection of responses, eventually selecting one which has a favorable outcome. In a simulation environment a favorable outcome occurs when the convergence angle remains unchanged.

FIG. 5 is a set diagram of a set 80 of stimuli 82 occurring in the simulation environment. The set 80 includes a stimuli Y which correspondences to an object becoming larger in a simulation. The responses L, M, and N are as described with respect to FIG. 4, with response L corresponding to broadening the convergence angle, response M corresponding to narrowing the convergence angle, and response N corresponding to maintaining the convergence angle unchanged. As stated above, the observer will undertake a series of responses in response to stimuli Y. The favorable outcome in a simulation environment occurs when the observer selects response N and maintains the convergence angle unchanged. Thus, the association 84 between stimulus Y and response N represents the association providing the most favorable outcome in the simulation environment.

When the association 84 with response N is more likely to occur than the association 86 with response L, the simulation user has adapted to the simulation. Prior to adaptation, however, the user repeatedly attempts to respond to the apparently approaching or retreating object by changing the convergence angle, response L or M, and the shape of the eyes as the simulated objects appear to approach or retreat. Being unsuccessful in focusing, the user eventually reverts to the initial convergence angle and ocular accommodation, only to be confronted with another simulated approach or withdrawal of an object. This repetitive drift from the initial convergence angle and return to the initial convergence angle to re-focus on the constant-distance focal plane causes the user eventually to adjust by maintaining focus at the fixed-distance focal plane. This repetitious drift and return to prior adjustment is known as optokinetic nystagmus. Further, the user sometimes maintains this adjustment outside the simulator, which is known as binocular dysphoria.

Thus, it is an object of the present invention to provide a technique for reducing simulator sickness experienced by a simulator user.

It is a further object of the present invention to provide a technique for reducing optokinetic nystagmus experienced by a simulator user.

It is yet a further object of the present invention to provide a technique for reducing binocular dysphoria experienced by a simulator user.

It is yet a further object of the present invention to provide a simulator in which objects appear to retreat from or approach the user while minimizing simulator sickness.

It is yet a further object of the present invention to provide a simulator in which objects appear to approach or retreat from the user while minimizing optokinetic nystagmus.

It is yet a further object of the present invention to provide a simulator in which objects appear to approach or withdraw from the user while minimizing binocular dysphoria.

SUMMARY OF THE INVENTION

This invention is directed to an apparatus for reducing video simulator induced sickness occurring in a user which is caused by optical adjustments made by the user to track a primary object which appears either retreat from or approach the user. The apparatus includes a display unit for displaying simulation images. A simulator control unit inserts into the simulation image a complementary object associated with the primary object. The complementary object appears to do the opposite of the primary object. That is, if the primary object appears to approach the user, the complementary object appears to retreat from the user. Conversely, if the primary object appears to retreat from the user, the complementary object appears to approach the user.

DETAILED DESCRIPTION OF THE INVENTION

Figure 1:
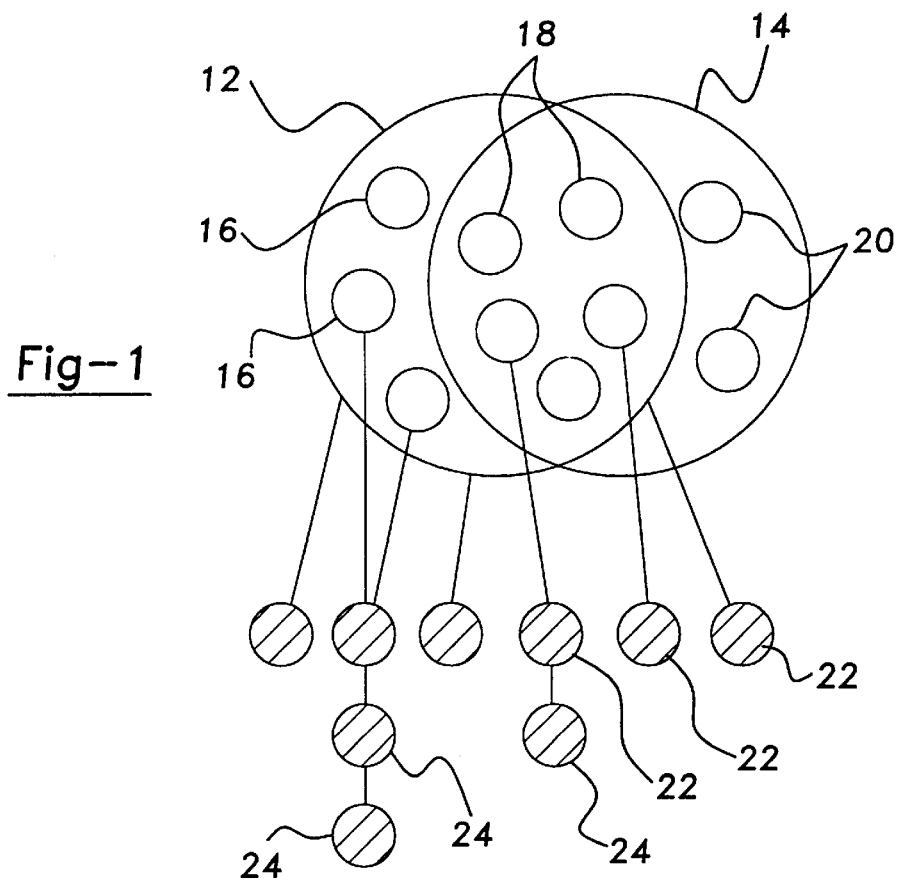
FIG. 1 is a set diagram showing sets of stimuli and the responses associated with each stimuli for an actual event and a simulated event.
Figure 2:
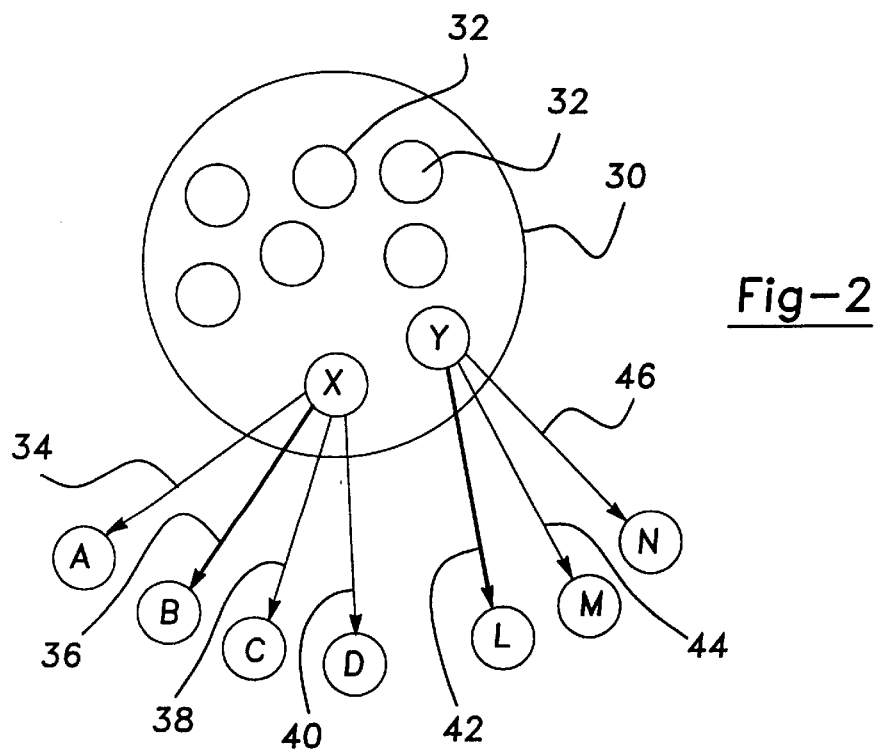
FIG. 2 is a set diagram of a set of stimuli for an actual event, the responses to particular stimuli, and associations between the stimuli and the responses.
Figure 3:
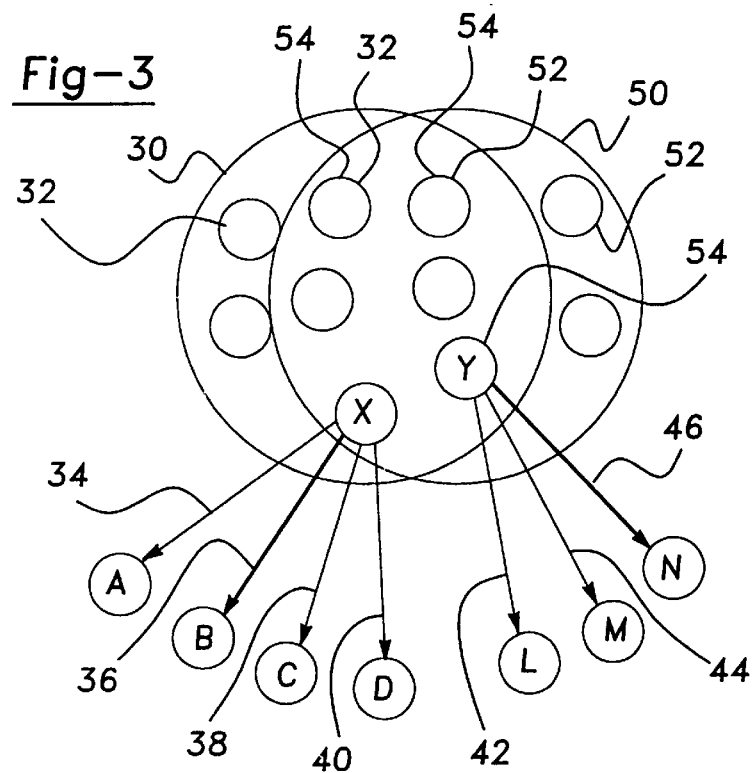
FIG. 3 is a set diagram of two sets of stimuli corresponding to an actual event and a simulated event, responses to particular stimuli common to the actual and simulated event, and associations between the stimuli and the responses.
Figure 4:
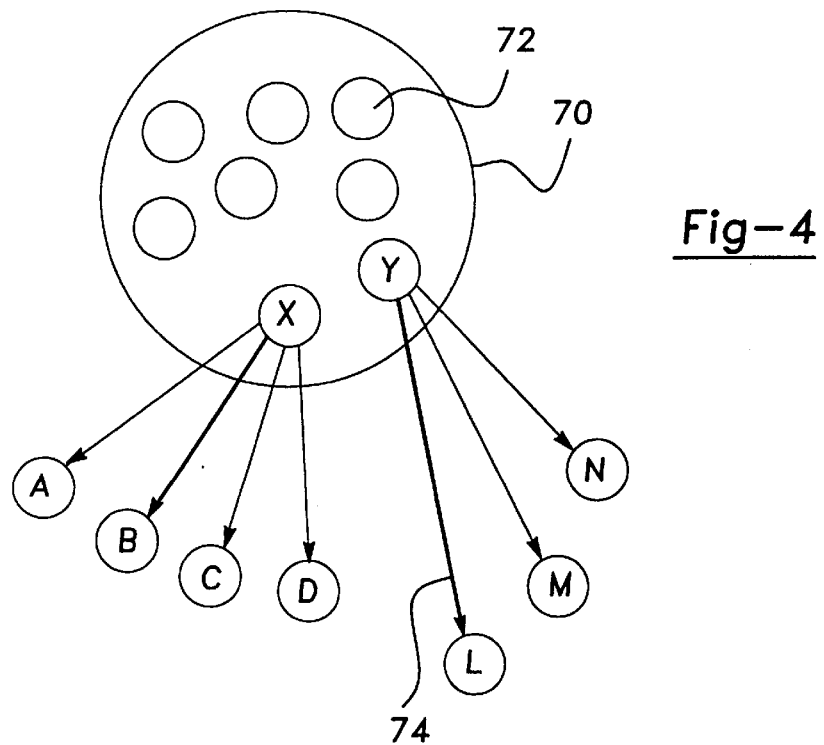
FIG. 4 is a set diagram for a set of stimuli for an actual event, responses to particular stimuli, and associations between the stimuli and the responses, where one of the stimuli represents an object approaching an observer in the actual event.
Figure 5:
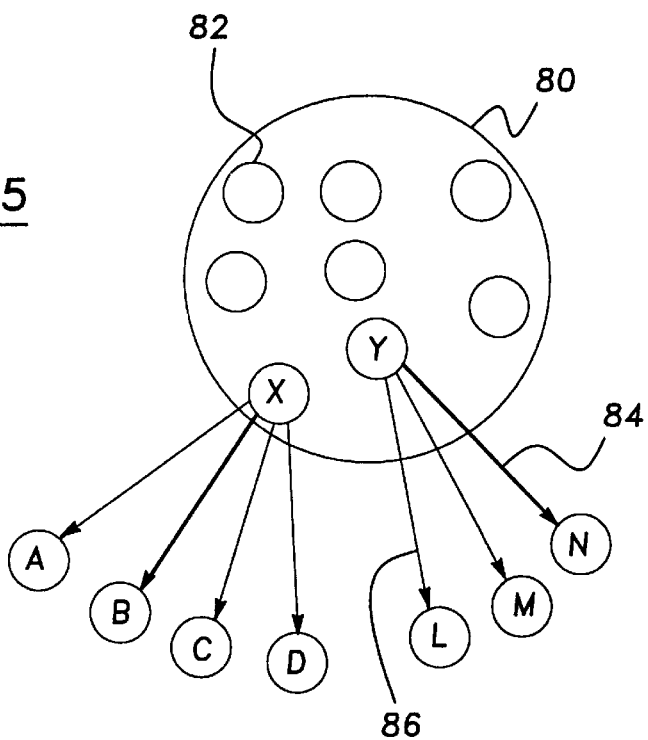
FIG. 5 is a set of stimuli for a simulation, responses to particular stimuli, and associations between the stimuli and responses, where one of the stimuli represents an object appearing to approach the observer in the simulation.
Figure 6:
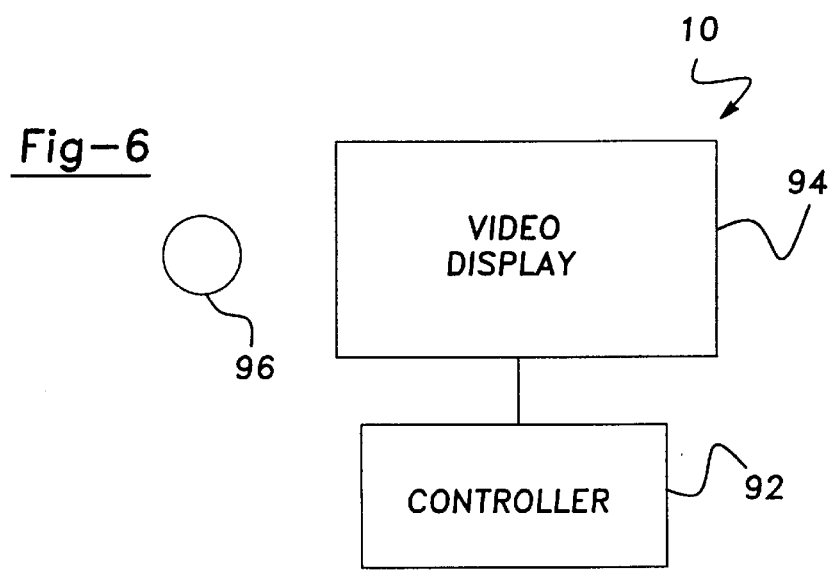
FIG. 6 is a block diagram of the simulator for reducing simulation sickness arranged in accordance with the principles of the present invention.

FIG. 6 is a block diagram of a simulator 10 arranged in accordance with the principles of the present invention. The simulator 10 reduces simulator sickness by implementing a competing and opposing stimulus theory described herein. The simulator 10 includes a controller 92 and a video display 94 which is viewed by an operator or user 96. The controller 92 generates control signals to operate the video display 94 to provide a simulation to user 96. It will be understood by one skilled in the art that the video display 94 may be any of a number of video display simulators commonly known in that art. For example, the video display 94 may be a flat screen video display, a helmet mounted video display, a standard television-monitor video display or the like. The controller 92 generates control signals which provide commands to generate the simulation on the video display 94.

Figure 7:
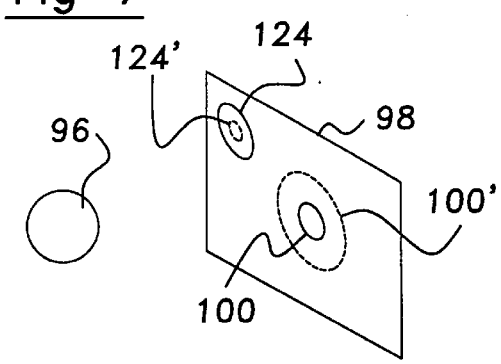
FIG. 7 is a perspective view of the user and a video display of an object appearing to approach the user.
Figure 8:
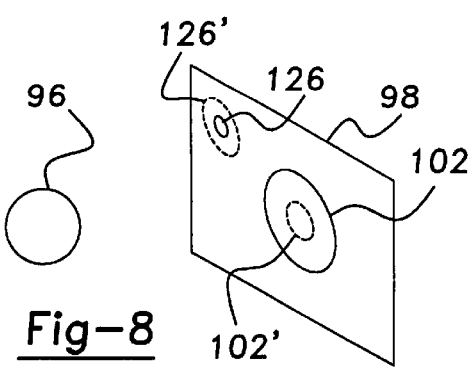
FIG. 8 is perspective view of the user and a video display of an object appearing to withdraw or retreat from the user.

The present invention counteracts simulator sickness often caused by objects approaching or withdrawing from the user 96. FIG. 7 is a block diagram of the display portion 98 of video display 94. User 96 faces display portion 98. In order to cause an object 100 to appear to approach user 96, the simulator controller 92 generates control commands to expanded object 100 to object 100', shown in phantom. This expansion occurs by increasing the number of pixels taken up by object 100'. As object 100 expands and takes up more pixels, object 100 appears as if it is approaching user 96. Similarly, FIG. 8 is a block diagram of the display portion 98 of video display 94 projecting an image of an object 102. In order to cause object 102 to appear to withdraw or retreat from user 96, the simulator controller 92 generates control commands to reduce object 102 to object 102'. The reduction occurs by decreasing the number of pixels taken by object 102'. As object 102 becomes smaller and takes up fewer pixels, object 102 appears as if it is retreating from user 96.

Figure 9:
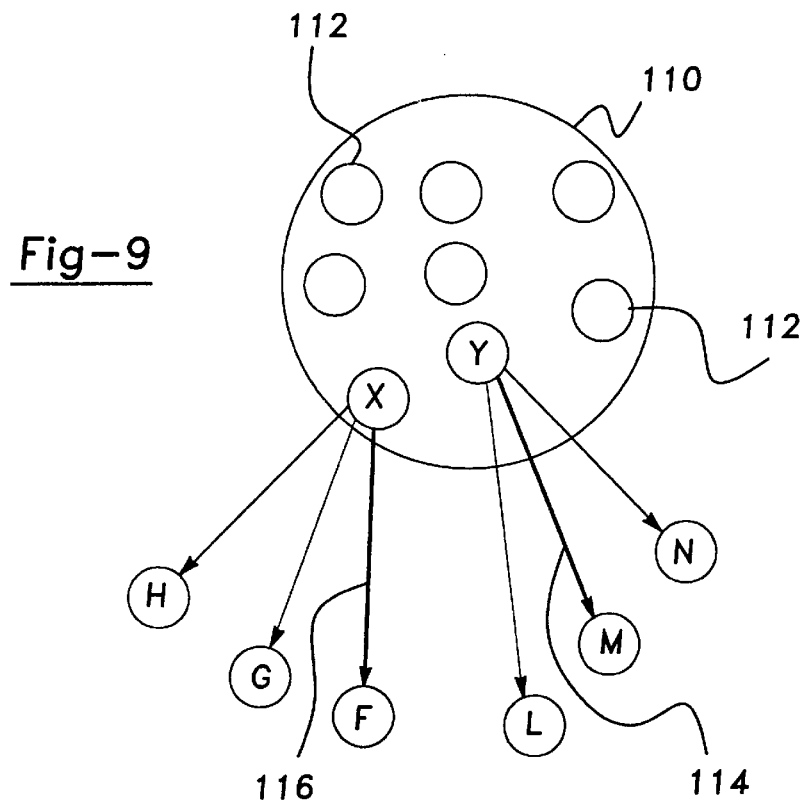
FIG. 9 is a set diagram of a set of opposing stimuli for an actual event, and responses associated with each stimuli, where one stimuli represents an object appearing to approach user and another stimuli represents an object appearing to withdraw from the user.
Figure 10:
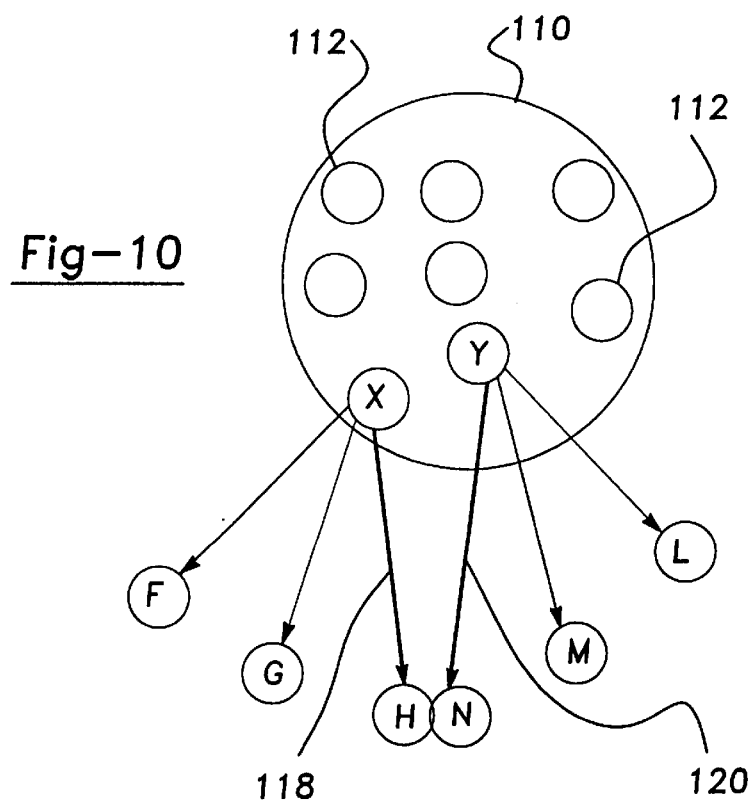
FIG. 10 is a set diagram of the stimuli associated with a simulation and responses associated with each stimuli, where one stimuli represents an object appearing to approach the user and another stimuli represents an object appearing to withdraw from the user, and the responses associated with each stimuli are selected to provide an outcome suitable for both stimuli.

In FIG. 9 and 10 set 110 of stimuli 112 represents the set of stimuli available for output by simulator 10. Stimulus X represents an object appearing to withdraw from the user, and stimulus Y represents an object appearing to approach the user. Stimulus X elicits responses F, G, and H which corresponds to narrowing, broadening, and maintaining, respectively, the angle of convergence of the eyes. Similarly, stimulus Y elicits responses L, M, and N which correspond to narrowing, broadening, and maintaining, respectively, the angle of convergence of the eyes. Referring to FIG. 9, stimulus Y is strongly associated with response M as shown by the thickness of association 114. Stimulus X is equally strongly associated with response F as shown by the thickness of association 116. Response M and response F are opposite and competing, they require the same resources, the human visual system. As shown at FIG. 10, if stimulus X and stimulus Y are presented simultaneously and at equal perceptual intensity, response H or N will be expressed because these responses are the same response for both stimuli X and Y. The combined strength of associations 118 and 120 for stimuli X and Y to responses H and N, respectively, is greater than the association for either F or M, respectively.

FIG. 10 thus illustrates the competing and opposing stimulus theory. This theory proposes that for identical responses H and N to stimuli X and Y, respectively, the force of associations 118 and 120 are additive. If stimuli X and Y are associated with responses F and M or G and L, which require conflicting use of the same physical resources, and the same stimuli X and Y share a common response H and N, respectively, and if the combined strength of association for both stimuli X and Y to the common response H and N is greater than the strength of association of either single stimulus X and Y to another response, the common response will be expressed.

In operation, the effect during a simulation of object 100 of FIG. 7 appearing to approach the user 96 may be counteracted by inserting an object 124 appearing to withdraw or retreat from the user 96. The simulator controller 92 causes object 124 to appear to retreat from the user 96 by reducing the number of pixels which object 124 takes up. Object 124 is reduced to object 124'. Similarly, the effect of object 102 of FIG. 8 appearing to withdraw from the user 96 may be counteracted by inserting an object 126 appearing to approach user 96. The simulator controller 92 causes object 126 to appear to approach the user by increasing the number of pixels that object 126 takes up. Object 126 expands to object 126' which provides the appearance to user 96 that the object is approaching. The competing objects cause the user 96 to maintain the eyes at a constant convergence angle H and N and stay focused on the simulator. This prevents user 96 from learning responses which are undesirable outside of the simulator.

In operation, the controller 92 can monitor the apparent approach or withdrawal of any object by monitoring the pixels that an object requires for display. The controller 92 can then insert a complementary object, such as objects 124 and 126 which do the opposite of primary objects 100 or 102, respectfully, detected by the controller 92. The objects 124 and 126 inserted by controller 92 need not be the same size or readily visible, but could be inserted to provide subliminal effect on the user 96. Preferably, the primary objects 100 and 102 and complementary objects 124 and 126 appear to approach or retreat, respectively, at substantially the same rates.

When competing and opposing stimulus objects are included in the simulation, the simulation user responds by focusing at a fixed distance. The user 96 has not learned an inappropriate response or one that will carry over outside the simulation. Further, an association between a stimulus and an inappropriate response was not strengthened. Rather, responses were selected which had a combined strength of association greater than other available responses. Additionally, because the simulation user has not learned inappropriate behaviors in the simulation environment, no cybersickness or cybersickness flashback will occur.

Although the invention has been described with particular reference to certain preferred embodiments thereof, variations and modifications can be effected within the spirit and scope of the following claims.

What is claimed is:

1. An apparatus for reducing video simulator induced sickness occurring in a user which is caused by optical adjustments made by the user to track a primary object, comprising:

a display unit for displaying a simulation image having a primary object; and a simulator control unit for inserting into the simulation image a complementary object associated with the primary object which appears to one of retreat from or approach the user at a first rate, the complementary object appearing to the other of retreat from or approach the user at a second rate in a direction opposite the primary object, wherein the first rate is substantially the same as the second rate.

2. The apparatus as defined in claim 1 wherein the display unit is structurally adapted to remain generally fixed with respect to the user.

3. The apparatus as defined in claim 1 wherein the display unit is structurally adapted to remain a generally constant distance from the user.

4. The apparatus as defined in claim 1 wherein the control unit inserts the complementary object into the simulation image so that the complimentary object does not dominate the simulation image.

5. A method for reducing video induced sickness occurring in a user which is caused by optical adjustments by the user in order to track a primary object appearing in a video image, where the primary object appears to one of retreat from or approach the user at a first rate, comprising the step of inserting a complementary object in response to the primary object into the video image so that the complementary object appears to the other of retreat from or approach the user in a direction opposite the primary object at a second rate which is substantially the same as the first rate.

6. The method of claim 5 further comprising inserting the complementary object so that the complimentary object does not dominate the video image.

7. An apparatus for presenting a visual display to a user for reducing simulator induced sickness, comprising:

a display device for displaying visual images in response to a video signal; and a video signal source which outputs the video signal, where the video signal includes at least one of the following:

an object which appears to move toward the user, and the video signal also includes a complementary object associated with the object which appears to move away from the user at substantially the same rate, and an object which appears to move away from the user, and the video signal also includes a complementary object associated with the object which appears to move toward the user at substantially the same rate.

8. The apparatus of claim 7 wherein the display device displays the visual images such that the complementary object does not dominate the video image.

* * * * *